Figure 1:
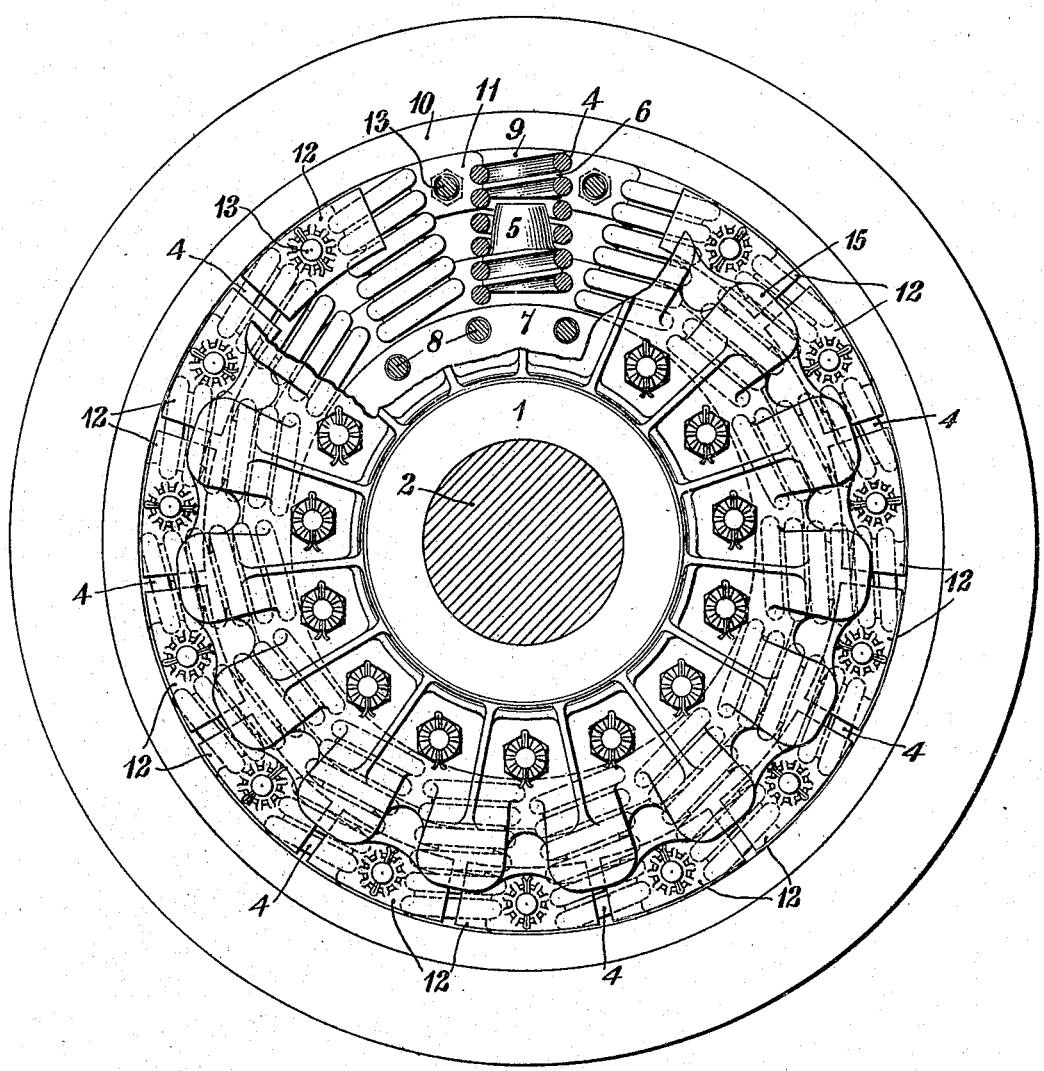

J. E. WEBSTER.
VEHICLE WHEEL.
APPLICATION FILED APR. 10, 1908.

937,345.

Patented Oct. 19, 1909.
2 SHEETS—SHEET 1.

WITNESSES:
C. L. Belcher
Otto S. Schairer

INVENTOR
John E. Webster
BY
Wesley E. Carr
ATTORNEY

J. E. WEBSTER.
VEHICLE WHEEL.
APPLICATION FILED APR. 10, 1908.
937,345.
Patented Oct. 19, 1909.
2 SHEETS—SHEET 2.
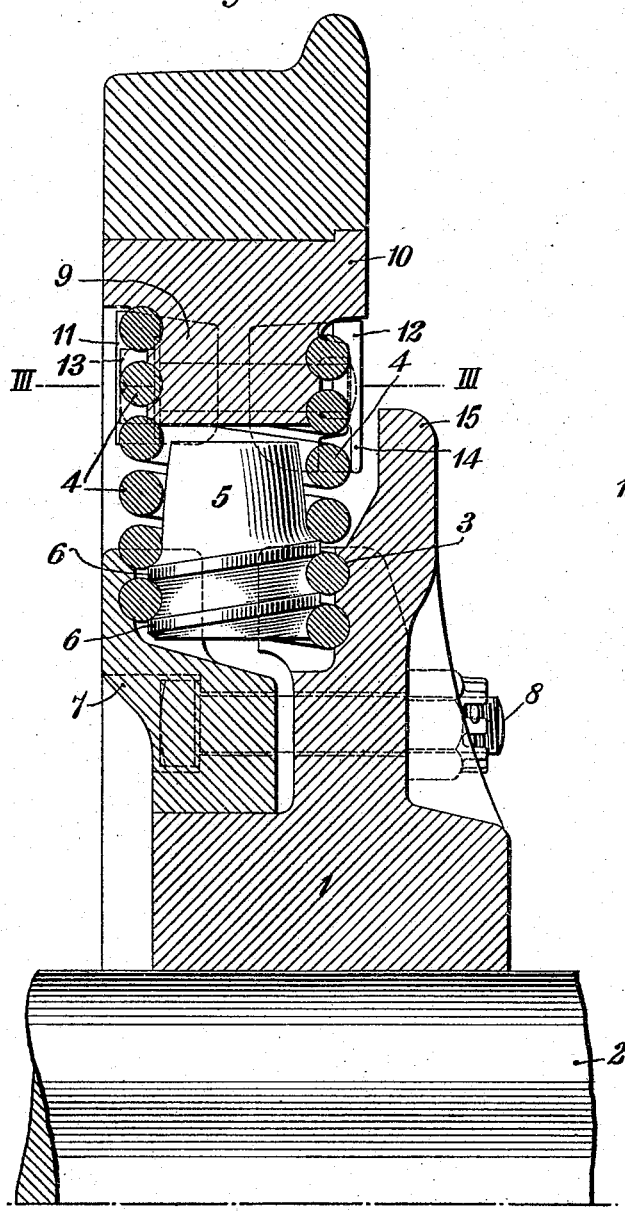
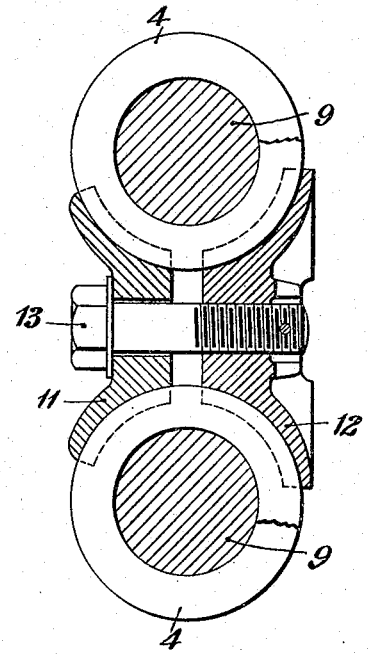
WITNESSES:
C. L. Belcher
Otto S. Schairer
INVENTOR
John E. Webster
BY
Wesley E. Carr
ATTORNEY

UNITED STATES PATENT OFFICE.

JOHN E. WEBSTER, OF PITTSBURG, PENNSYLVANIA, ASSIGNOR, BY MESNE ASSIGN-
MENTS, TO WESTINGHOUSE ELECTRIC & MANUFACTURING COMPANY, OF EAST
PITTSBURG, PENNSYLVANIA, A CORPORATION OF PENNSYLVANIA.

VEHICLE-WHEEL.

937,345.     Specification of Letters Patent.    Patented Oct. 19, 1909.

Application filed April 10, 1908. Serial No. 426,343.

*To all whom it may concern:*

Be it known that I, JOHN E. WEBSTER, a citizen of the United States, and a resident of Pittsburg, in the county of Allegheny and State of Pennsylvania, have invented a new and useful Improvement in Vehicle-Wheels, of which the following is a specification.

My invention relates to vehicle wheels, and particularly to the wheels that are employed in connection with railway vehicles.

The object of the invention is to provide a wheel that shall possess a considerable degree of resiliency and shall be simple, strong and durable in construction.

The rails and roadbeds of electric railway systems are generally subjected to much more severe service than those of steam railway systems, because the propelling motors are usually either partially or wholly supported by the axles without the interposition of resilient means for absorbing shocks. In order to relieve the tracks and roadbeds of electric railway systems, and of other systems also, if desired, from unduly severe service, I have devised a wheel having a suitable degree of resiliency between the rim and the hub thereof.

Figure 1 of the accompanying drawings is a view in side elevation of a wheel constructed in accordance with my invention, some of the parts being broken away and others being shown in section for the sake of clearness of illustration. Fig. 2 is a vertical sectional view through a portion of the wheel of Fig. 1, and Fig. 3 is a sectional view on the line III—III of Fig. 2.

A hub or spider 1 that is mounted upon an axle 2 is provided, near its outer edge, with a plurality of sets of substantially semi-circular helical grooves 3 constituting seats for the end convolutions of a plurality of radially arranged helical springs 4, into the inner ends of which are inserted plugs 5 having smooth tapered outer ends and screw-threads 6, of the same pitch as that of the springs 4 upon their inner ends, and between which the end convolutions of the said springs are located. The inner ends of the springs 4 are clamped tightly upon the ends of the plugs 5 and against the seats 3 upon the spider by means of a ring 7 that is secured to the spider by means of bolts 8, the inner face of the ring 7 being also provided with substantially semi-circular helical grooves constituting seats for the end convolutions of the springs.

The outer ends of the springs 4 are screwed upon internal projections 9 from a rim 10, between the ends of which and of the plugs 5 suitable clearance spaces are left, the springs being secured upon the projections 9 by means of plates 11 and 12. The plates 11 and 12 are provided with helical grooves constituting seats for the end convolutions of the springs, and are interposed between adjacent springs, tap bolts 13 being employed for clamping the same upon the springs. The plates 12 are also provided with inwardly projecting lips 14 that extend into the spaces between the outer ends of the plugs 5 and extensions 15 from the outer edge of the spider 1.

In assembling the structure, the plugs 5 may be first inserted in the inner ends of the springs and then the outer ends thereof should be screwed upon the projections 9. The plates 11 and 12 should next be applied for the purpose of securing the springs to the projections 9, and, finally, the inner ends of the springs should be secured to the spider 1 by means of the clamping ring 7. Thus it is seen that, since there is a very small amount of necessary machine work upon the wheel and also by reason of its simplicity of construction, it is relatively inexpensive to manufacture.

The longitudinal deflections of the springs are limited by means of the plugs 5 and the projections 9 which are brought into engagement at a predetermined pressure, while the lateral deflections of the spring are limited in one direction by the engagement of the lips 14 with the extensions 15, and in the other direction by the clamping of the convolutions of the spring between the lips 14 and the plugs 5. Since the springs are normally held in the position shown in Fig. 2, there is but a small amount of wear upon the parts, practically all of the necessary work being done by the springs.

I claim as my invention:

1. In a vehicle wheel, the combination with a spider having lateral spring seats, a plurality of radially arranged helical springs, plugs projecting into the inner ends of the springs, and means for clamping the springs to the plugs and against the spring seats upon the spider, of a rim having internal projections extending into the outer ends of the springs, and means for clamping the outer ends of the springs to the projections.

2. In a vehicle wheel, the combination with a spider having lateral spring seats, a plurality of radially arranged helical springs, plugs projecting into the inner ends of the springs, and means for clamping the inner ends of the springs against the spring seats upon the spider, of a rim having internal projections extending into the outer ends of the springs, and means for clamping the springs to the projections that serve also to limit lateral deflections of the springs.

3. In a vehicle wheel, the combination with a spider, a plurality of radially arranged helical springs, plugs projecting into the inner ends of the springs, a clamping ring for the inner ends of the springs, and means for securing it to the spider, of a rim having internal projections extending into the outer ends of the springs, and means for clamping the springs to said projections, said means extending between the ends of the said plugs and a portion of the spider.

4. In a vehicle wheel, the combination with a spider, a plurality of radially arranged helical springs, plugs projecting into the inner ends of the springs, and means for securing the springs to the plugs and to the spider, of a rim having internal projections extending into the outer ends of the springs.

5. In a vehicle wheel, the combination with a spider, of a plurality of radially arranged helical springs, plugs projecting into the inner ends of the springs, and means for securing the springs to the plugs and to the spider, of a rim having internal projections extending into the outer ends of the springs, and means for securing the outer ends of the springs to the said projections.

6. In a vehicle wheel, the combination with a spider, of a plurality of radially arranged helical springs, plugs projecting into the inner ends of the springs, and means for securing the springs to the plugs and to the spider, of a rim having internal projections extending into the outer ends of the springs, and means for securing the outer ends of the springs to the said projections, said means serving also to limit lateral deflections of the springs.

7. In a vehicle wheel, the combination with two concentric members, and a plurality of radially arranged helical springs interposed between the said members, of plugs projecting into the ends of the springs, one set of said plugs being formed integral with one of the members, and means for securing to the other member the ends of the springs into which the remaining plugs project.

8. In a vehicle wheel, the combination with two concentric members, and a plurality of radially arranged helical springs interposed between the said members, of plugs projecting into the ends of the springs, one set of said plugs being formed integral with one of the members, and means for securing to the other member the ends of the springs into which the remaining plugs project, the said means serving also to limit lateral deflections of the springs.

In testimony whereof, I have hereunto subscribed my name this 2nd day of April, 1908.

JOHN E. WEBSTER.

Witnesses:
  OTTO S. SCHAIRER,
  BIRNEY HINES.